United States Patent
Boppart

[11] 3,719,301
[45] March 6, 1973

[54] GREENHOUSE PLANTING BOX

[75] Inventor: Eugene A. Boppart, Woodstock, Ill.

[73] Assignee: Velsicol Chemical Corporation, Chicago, Ill.

[22] Filed: Sept. 11, 1970

[21] Appl. No.: 71,537

[52] U.S. Cl. .................................. 217/5 R, 47/34.13
[51] Int. Cl. ................................................ B65d 9/06
[58] Field of Search ............ 217/5, 7, 36, 43, 40, 42; 47/34.13, 37

[56] References Cited

UNITED STATES PATENTS 2,124,217  7/1938  Van Benschoten ................... 217/40
2,949,200  8/1960  Haag ..................................... 220/93
61,479  1/1967  Smith ................................. 47/34.13

Primary Examiner—Joseph R. Leclair
Assistant Examiner—James R. Garrett
Attorney—Robert J. Schwarz

[57] ABSTRACT

A greenhouse planting box composed of an upwardly open frame, a base construction and a planting board removably supported on the base. The board is adapted to support individual pots and the pots can be lifted on the board whereby they can be removed individually or as a whole. The planting box is formed with hand access openings in an opposed pair of walls for permitting grasping and lifting of the planting board.

3 Claims, 5 Drawing Figures

PATENTED MAR 6 1973
3,719,301
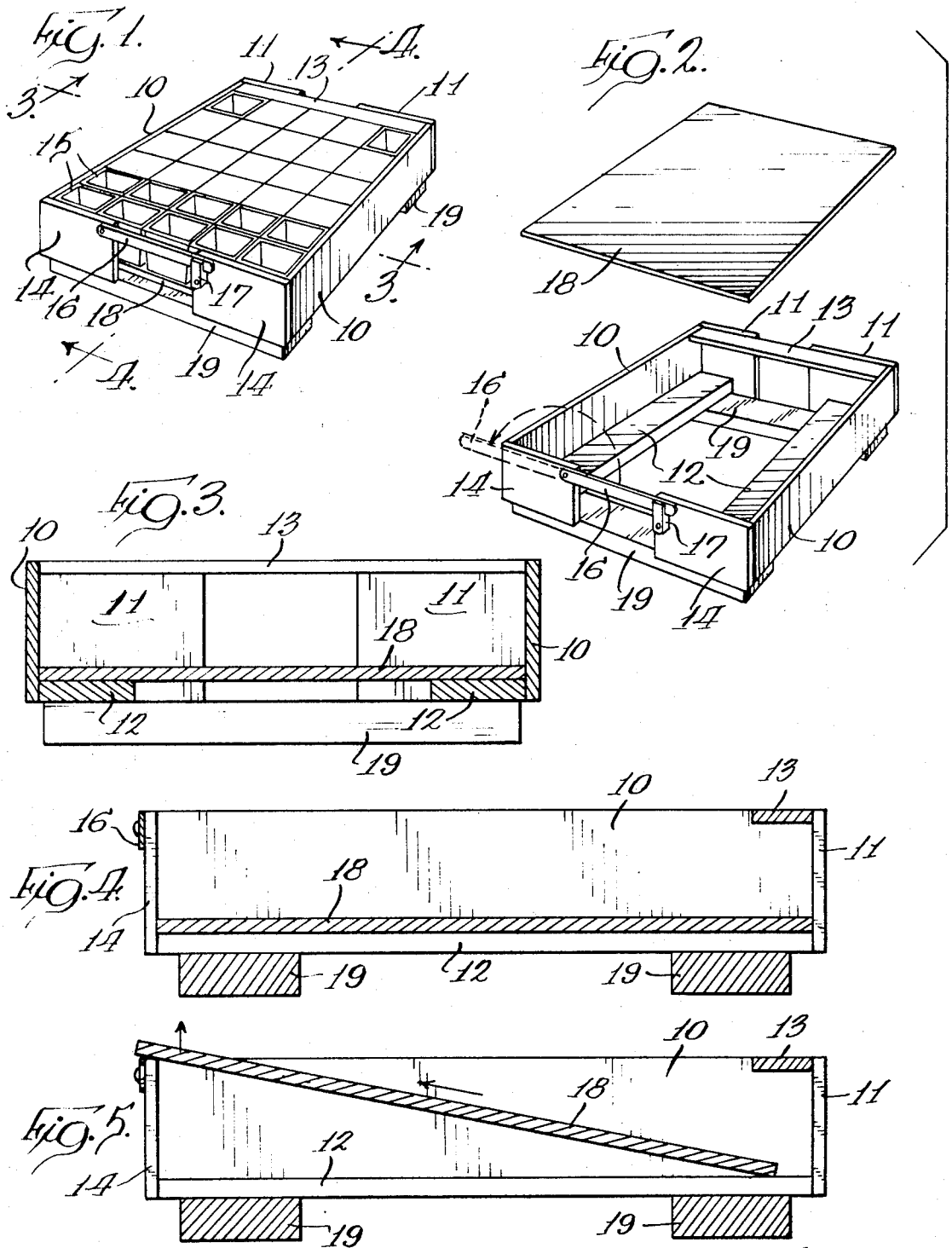
Inventor:
Eugene A. Boppart
By Robert J. Schwarz
Atty

GREENHOUSE PLANTING BOX

This invention relates to planting boxes having use in greenhouse planting of seed and transplant potting. The present invention is particularly useful when large numbers of flat boards are to be transferred from headhouse to greenhouse tables.

A particular advantage of the planting box of the present invention is that it eliminates the use of regular greenhouse flats. Further the planting box of the present invention can be custom made to the size and number of pots desired by the individual. Moreover, the pots can remain on the same board for planting to use or for sale. Additionally the present construction and arrangement saves storage space, the present planting boards taking about one-eighth of the space required by previous constructions.

The objects of the present invention, its details of construction and arrangement of parts and the economics thereof will be apparent from a consideration of the following specification and accompanying drawings, wherein:

FIG. 1 is a perspective view showing the planting box of the present invention.

FIG. 2 is an exploded perspective view of the planting box of the present invention.

FIG. 3 is a section on the line 3—3 of FIG. 1.

FIG. 4 is a section on the line 4—4 of FIG. 1, and

FIG. 5 is a sectional view similar to that of FIG. 4 but with the planting board in edgewise elevated position.

Referring to the drawings, the reference numerals 10—10 indicate the side walls of my planting box. The reference numerals 11—11 indicate two spaced rear end wall components secured to one end of the spaced base members 12—12. A tie bar 13 is provided between the sides 10—10 adjacent the rear end wall components for reinforcing or structural purposes, and although shown to be of wood, it can be in the form of a metal rod suitably bolted to and between the side walls 10—10.

A front wall composed of the spaced parts 14—14 are secured between the sides 10—10 and to the base members 12—12. While the bar or rod 13 provides a closure at one end of the box preventing pots from falling or being pushed out, the front wall is provided with a pivoted latch 16 and keeper 17 to permit optional closure and removal of pots 15.

Removably seated on the base members 12—12 and between the respective side and end walls is the planting board 18. The base members 12—12 are further mounted on and desirably, but optionally secured to the transverse foot members 19—19. The latter are secured or spaced slightly inwardly of the opposed end walls to leave an overhang of the board 18 whereby it may be edgewise grasped manually through the spaced openings between the end walls 11—11 and 14—14 respectively and the planting board lifted as shown in FIG. 5, with a slight shifting motion towards the end walls 14—14 and rested thereon if desired as illustrated, on the board 18 with pots 15 entirely lifted out and placed on a conventional transfer cart or in a greenhouse.

Although I have illustrated my planting box to be composed of wood it may be composed of conventional composition board or of hard rubber or conventional rigid synthetic plastic material. In the latter cases various of the components can be molded in one or more pieces as economics dictates.

Thus although I have described the preferred embodiment of my invention various changes may be made therein by those skilled in the art withing the scope of the following claims.

I claim:

1. A greenhouse planting box comprising side walls, end walls, fixed spaced bottom members extending between said end walls disposed parallel and adjacent to said side walls, a planting board removably disposed between said walls and on said bottom members, at least one of said end walls being formed with a hand access opening whereby said planting board may be edgewise lifted from said bottom members wherein at least one of said end walls is divided to form said hand access opening, and latch means extending across said opening to retain planters disposed on said planting board.

2. A greenhouse planting box comprising side walls, end walls, fixed spaced bottom members extending between said end walls disposed parallel and adjacent to said side walls, a planting board removably disposed between said walls and on said bottom members, at least one of said end walls being formed with a hand access opening whereby said planting board may be edgewise lifted from said bottom members including support means extending transversely of said bottom members and inwardly of said end walls to provide a manual grasping edge projection of said planting board.

3. A greenhouse planting box comprising side walls, end walls, fixed spaced bottom members extending between said end walls disposed parallel and adjacent to said side walls, a planting board removably disposed between said walls and on said bottom members, one of said end walls being formed with a hand access opening whereby said planting board may be edgewise lifted from said bottom members, latch means extending across said opening to retain planters disposed on said planting board, the opposed end wall being also divided to form a hand access opening to said planting board, a top cross bar disposed and secured between said side walls and adjacent said opposed divided end wall, and extending transversely of said bottom members and inwardly of said end walls to provide a manual grasping edge projection of said planting board.

* * * * *